(12) United States Patent
Sharmin et al.

(10) Patent No.: US 7,740,694 B2
(45) Date of Patent: Jun. 22, 2010

(54) INK JET INK COMPOSITION AND METHOD FOR PRINTING

(75) Inventors: Sumana Sharmin, Schaumburg, IL (US); Ayesha Syed, Glendale Heights, IL (US)

(73) Assignee: Videojet Technologies Inc

( * ) Notice: Subject to any disclaimer, the term of this patent is extended or adjusted under 35 U.S.C. 154(b) by 417 days.

(21) Appl. No.: 11/478,872

(22) Filed: Jun. 30, 2006

(65) Prior Publication Data
US 2008/0000386 A1  Jan. 3, 2008

(51) Int. Cl.
*C09D 11/02* (2006.01)
(52) U.S. Cl. ............... 106/31.27; 106/31.37; 106/31.58
(58) Field of Classification Search ............... 106/31.27, 106/31.37, 31.58
See application file for complete search history.

(56) References Cited

U.S. PATENT DOCUMENTS

| | | | |
|---|---|---|---|
| 4,024,096 A | 5/1977 | Wachtel | |
| 5,443,628 A | 8/1995 | Loria et al. | |
| 5,693,127 A | 12/1997 | Nigam et al. | |
| 5,800,601 A | 9/1998 | Zou et al. | |
| 5,837,042 A | 11/1998 | Lent | |
| 5,889,083 A | 3/1999 | Zhu | |
| 6,010,564 A | 1/2000 | Zhu et al. | |
| 6,117,225 A | 9/2000 | Nicolls | |
| 6,133,342 A | 10/2000 | Mizobuchi et al. | |
| 6,140,391 A | 10/2000 | Zou et al. | |
| 6,210,472 B1 | 4/2001 | Kwan et al. | |
| 6,221,933 B1 | 4/2001 | Zhu et al. | |
| 6,235,829 B1 | 5/2001 | Kwan | |
| 6,251,175 B1 | 6/2001 | Zhu et al. | |
| 6,261,348 B1 | 7/2001 | Kwan et al. | |
| 6,372,819 B1 | 4/2002 | Mizobuchi et al. | |
| 6,444,019 B1 | 9/2002 | Zou et al. | |
| 6,478,861 B1 | 11/2002 | Kwan et al. | |
| 6,645,280 B1 | 11/2003 | Zhu et al. | |
| 6,726,756 B1 * | 4/2004 | Zou et al. ............... 106/31.57 |
| 6,747,072 B1 | 6/2004 | Siddiqui | |
| 6,908,186 B2 | 6/2005 | Zheng et al. | |
| 6,986,808 B2 | 1/2006 | Fu et al. | |
| 7,025,816 B2 | 4/2006 | Suzuki et al. | |
| 7,041,162 B2 | 5/2006 | Ishizuka et al. | |
| 7,151,153 B2 | 12/2006 | Bruchmann | |
| 7,402,614 B2 | 7/2008 | Marguerettaz | |
| 2004/0110868 A1 * | 6/2004 | Zhu et al. ............... 523/160 |
| 2004/0154495 A1 | 8/2004 | Zhu et al. | |
| 2004/0220298 A1 | 11/2004 | Kozee et al. | |
| 2005/0090579 A1 | 4/2005 | Zhu et al. | |
| 2005/0092204 A1 | 5/2005 | Zhu et al. | |
| 2005/0166793 A1 | 8/2005 | Looman et al. | |
| 2005/0248645 A1 | 11/2005 | Jenkins et al. | |
| 2006/0107868 A1 | 5/2006 | Potenza et al. | |

FOREIGN PATENT DOCUMENTS

| JP | 57-195775 A | 12/1982 |
|---|---|---|
| JP | 59-074173 A | 4/1984 |
| JP | 10-306221 A | 11/1988 |
| JP | 02-016171 A | 1/1990 |
| JP | 2003-192930 A | 7/2003 |

OTHER PUBLICATIONS

Anna. "Elasto-Capillary Thinning and Breakup of Model Elastic Liquids," *Journal of Rheology*, 45(1): 115-138 (Jan./Feb. 2001).
Bazilevsky et al., "Effects of Polymeric Additives on Vapor Bubble Dynamics in Thermal Ink Jet Printing," *IS&Ts NIP 14: 1998 International Conference on Digital Printing Technologies*, 15-18 (1998).
Evans et al., "Optimisation of Ink Jet Droplet Formation Through Polymer Selection," *IS&Ts NIP 15: 1999 International Conference on Digital Printing Technologies*, 78-81 (1999).
Meyer et al., "Effects of Polymeric Additives on Thermal Ink Jets," *IS&T's NIP 13: 1997 International Conference on Digital Printing Technologies*, 675-680 (1997).
Shield et al., "Drop Formation by DOD Ink-Jet Nozzles: A Comparison of Experiment and Numerical Simulation," *IBM Journal of Research and Development*, 31(1): 96-110 (Jan. 1987).

* cited by examiner

*Primary Examiner*—Jerry Lorengo
*Assistant Examiner*—Veronica Faison Gee
(74) *Attorney, Agent, or Firm*—Joseph A. Yosick

(57) ABSTRACT

Disclosed is an ink jet ink composition suitable for printing on substrates such as glass and metal. The ink jet ink composition comprises two or more organic solvents at least one of which is an alcohol, three or more binder resins comprising nitrocellulose, a thermoplastic polyurethane, and a polyvinylbutyral resin, two or more adhesion promoters, and a soluble colorant. Also disclosed is a method of printing images on such glass and metal substrates. The ink jet ink composition provides improved print quality and reduced need for cleaning the nozzle.

23 Claims, No Drawings

INK JET INK COMPOSITION AND METHOD FOR PRINTING

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream so that the droplets are caused to form the desired printed image on that surface.

The technique of ink jet printing or non-contact printing is particularly well suited for application of characters onto irregularly shaped surfaces, including, for example, glass, metal, or plastic containers, generally used for holding beverage, cosmetic, pharmaceutical, liquor, and health care products.

In general, an ink jet ink composition should meet certain requirements to be useful in ink jet printing operations. These relate to viscosity and resistivity of the ink, the solubility and compatibility of the components, and/or the wettability of the substrate. Further, the ink should be quick drying and smear resistant, and be capable of passing through the ink jet nozzle(s) without clogging, and permit rapid cleanup of the machine components with minimum effort. The printed message or image should also resist abrasion and in some cases mild solvents.

Certain substrates such as glass and metal present challenges to ink jet printing. The quality of some of the attempted ink jet ink compositions is such that there is a need to improve one or more properties such as moisture penetration, adhesion, isopropanol splash resistance, and ice bucket rub resistance. Certain ink jet ink compositions also cause ink buildup on the printer nozzle plate, thereby requiring frequent clean up and maintenance.

Thus, there exists a need for an ink jet ink composition for printing on glass and metal substrates having improved performance characteristics, such as reduced ink buildup on the printer nozzle plate and solvent resistance, ice bucket rub resistance, and rub resistance of the printed images.

The invention provides such a composition. The advantages of the invention, as well as additional inventive features, will be apparent from the description of the invention provided herein.

BRIEF SUMMARY OF THE INVENTION

The foregoing needs are fulfilled by the present invention, which provides an ink jet ink composition that can produce high quality messages on glass and metal surfaces. The invention provides an ink jet ink composition comprising two or more organic solvents at least one of which is an alcohol, three or more binder resins comprising nitrocellulose, a thermoplastic polyurethane, and polyvinylbutyral, two or more adhesion promoters, and a soluble colorant. The invention also provides a method of printing on glass and metal substrates. The invention provides an ink jet ink composition advantageously having reduced ink buildup on the printer nozzle plate and desirable characteristics such as improved solvent resistance, improved ice bucket rub resistance, and/or improved rub resistance of the printed images. The ink jet ink composition of the invention provides one or more advantages: moisture penetration, reduced ink buildup on the printer nozzle plate, reduced down time or cleaning time, and improved print quality.

DETAILED DESCRIPTION OF THE INVENTION

Applicants have found that a combination of selected ingredients provides an advantageous ink jet ink composition having one or more attractive properties for printing on substrates such as glass and metal. Accordingly, the present invention provides an ink jet ink composition comprising two or more organic solvents at least one of which is an alcohol, three or more binder resins comprising nitrocellulose, a thermoplastic polyurethane, and polyvinylbutyral, two or more adhesion promoters, and a soluble colorant. The present invention provides an ink jet ink composition that can produce high quality messages on substrate surfaces such as glass and metal surfaces.

The two or more organic solvents can be present in any suitable amount, for example, from about 50% to about 90% by weight, preferably from about 60% to about 85% by weight, and more preferably from about 65% to about 75% by weight, of the ink jet ink composition. In an embodiment, the ink jet ink composition is free or substantially free of water. In an embodiment, the ink jet ink composition is free or substantially free of acetone.

One of the two or more organic solvents employed is an alcohol such as an alcohol having one to four carbon atoms, particularly, ethanol or isopropanol. The alcohol can be present in any suitable amount, for example, from about 2% to about 10% by weight, preferably from about 3% to about 8% by weight, and more preferably from about 4% to about 6% by weight, of the ink jet ink composition.

The ink jet ink composition of the invention comprises at least one organic solvent in combination with the alcohol. Any suitable organic solvents can be used as the additional organic solvent of the ink composition of the present invention, for example, the additional organic solvent can be a ketone, ester, or a combination of thereof. Particularly, the additional organic solvent is a ketone having from three to five carbon atoms, e.g., methyl ethyl ketone. The additional organic solvent(s) can be present in any suitable amount, for example, from about 55% to about 80% by weight, preferably from about 55% to about 75% by weight, and more preferably from about 60% to about 70% by weight, of the ink jet ink composition.

The ink jet ink composition of the invention comprises three or more binder resins, e.g., four, five, six, or more binder resins, comprising nitrocellulose, a thermoplastic polyurethane, and polyvinylbutyral. Any suitable binder resin can be employed in addition to the nitrocellulose, thermoplastic polyurethane, and polyvinylbutyral. Examples of additional binder resins include acrylics, polyesters, or polyolefins. The binder resins can be present in any suitable amount, for example, from about 10% to about 30% by weight, preferably from about 15% to about 25% by weight, and more preferably from about 18% to about 22% by weight, of the ink jet ink composition.

As discussed, one of the three or more binder resins is nitrocellulose. The nitrocellulose advantageously improves solvent splash resistance, particularly, isopropanol splash resistance. The nitrocellulose can be present in any suitable amount, for example, from about 10% to about 20% by weight, preferably from about 12% to about 18% by weight, and more preferably from about 13% to about 15% by weight, of the ink jet ink composition. Any suitable degree of nitration can be present on the nitrocellulose, for example, a degree of nitration of about 10.7% to about 12.2%. The nitrocellulose resin can have a suitable viscosity of about 700 to about 900 cPs (25° C., 35-37% solution in isopropanol). An example of a nitrocellulose resin is Nitrocellulose R3510, available from ICI Nobel, which has a degree of nitration of 11%, and a viscosity of 800 cPs at 25° C. and 36% solids in isopropanol.

As discussed, another of the three or more binder resins is a thermoplastic polyurethane. The thermoplastic polyurethane can be present in any suitable amount, for example, from about 2% to about 8% by weight, preferably from about 3% to about 7% by weight, and more preferably from about 4% to about 6% by weight, of the ink jet ink composition. The thermoplastic polyurethane can have any suitable viscosity, for example, a viscosity of about 1200 to about 1600 cPs at 25° C. and 75% solids. An example of suitable thermoplastic polyurethane is K-PLAST™ 1022, available from Mitchanol International, which has a viscosity of about 1400 cPs at 25° C. and 75% solids.

As discussed, yet another of the three or more binder resins is polyvinylbutyral resin. The polyvinylbutyral resin advantageously improves ice bucket rub resistance (or the image does not degrade when the printed glass bottle or other substrate is immersed in an ice bucket). The polyvinylbutyral resin can be present in any suitable amount, for example, from about 0.1% to about 1% by weight, preferably from about 0.3% to about 0.8% by weight, and more preferably from about 0.4% to about 0.6% by weight, of the ink jet ink composition. The polyvinylbutyral resin has any suitable molecular weight, for example, a number average molecular weight of about 20,000 or greater, particularly from about 40,000 to about 80,000, and more particularly from about 50,000 to about 70,000. Examples of suitable polyvinylbutyral resins are MOWITAL™ B 60 HH and MOWITAL B 20H, available from Kuraray, which have a number average molecular weights of 61,000 and 21,000, respectively.

The ink jet ink composition of the invention comprises two or more adhesion promoters. Any suitable adhesion promoters can be employed, particularly a polysiloxane and a silane in combination. The adhesion promoters can be present in any suitable amount, for example, from about 1% to about 10% by weight, preferably from about 2% to about 7.0% by weight, and more preferably from about 3% to about 5% by weight, of the ink jet ink composition. A suitable polysiloxane, for example, is a silicone resin. The polysiloxane can be present in any suitable amount, for example, from about 1% to about 5% by weight, preferably from about 1.5% to about 4.5% by weight, and more preferably from about 2% to about 3% by weight, of the ink jet ink composition. A suitable polysiloxane, for example, is Silicone Resin DC6-2230, available from Dow Corning. The silane can be present in any suitable amount, for example, from about 0.1% to about 3.0% by weight, preferably from about 0.5% to about 2.5% by weight, and more preferably from about 1% to about 2% by weight, of the ink jet ink composition. A suitable silane is SILANE™ A-187, which is gamma-glycidoxypropyl trimethoxysilane and available from OSi Specialties (now GE Silicones).

Any suitable colorant soluble in the organic solvents or mixture of organic solvents, e.g., a dye can be employed, particularly an azo dye, for example, anionic $Cr^{+3}$ complex dyes such Orasol Black RLI or Valifast Black 3808, available from CIBA Specialty Chemicals and Orient Corporation of America, respectively. The colorant can be present in any suitable amount, for example, from about 3% to about 10% by weight, preferably from about 4% to about 8% by weight, and more preferably from about 5% to about 6% by weight, of the ink jet ink composition.

The ink jet ink composition of the invention can further include one or more wetting agents. The wetting agent advantageously imparts adhesion to the substrate. Any suitable wetting agent can be used, for example, a polyalkylene oxide- (e.g., polyethylene oxide-) modified polydimethylsiloxane, such as SILWET™ L-7622, available from OSi Specialties (now GE Silicones). The wetting agent can be present in any suitable amount, for example, from about 0.001% to about 0.1% by weight, preferably from about 0.01% to about 0.06% by weight, and more preferably from about 0.02% to about 0.04% by weight, of the ink jet ink composition.

The ink jet ink composition of the invention can be prepared by methods known to those skilled in the art, for example, by combining and mixing the desired ingredients, and optionally filtering the resulting composition.

The present invention also provides a method for printing ink jet ink images on a substrate comprising ejecting from a plurality of orifices a series of droplets of any of the ink jet ink compositions described above to the substrate, controlling the timing of the emitted droplets with respect to the movement of the substrate so that the droplets form an image on the substrate, and allowing the images to dry. In accordance with the invention, the substrate can be any suitable substrate, particularly glass or metal. The ink jet ink composition can be used in any suitable printer, particularly a drop-on-demand printer, more particularly a hybrid drop-on-demand printer, e.g., a micro-valve printer such as VJ1120 (Videojet Technologies Inc.).

The ink jet ink composition of the present invention can be printed on a variety of glass bottles. Examples of suitable glass bottles include beer bottles, the returnable, and the non-returnable varieties. The jet ink composition of the present invention may be jet applied onto a variety of glasses, including soda-lime glasses, borosilicate glasses, aluminosilicate glasses, lead glasses, borate glasses, and the like. The glass containers can contain a coating thereon. Such a surface coating can improve the adhesion of the message to the bottles. The ink jet ink composition of the present invention can also be printed on a variety of metal substrates. Examples of suitable metal substrates include aluminum, tin, copper, stainless steel, alloy, and coated metal substrates.

The properties of the ink jet ink composition can be evaluated by any suitable method such as viscosity, density, resistivity, pH, velocity of sound, moisture penetration, e.g., penetration of any moisture present on the substrate during ink jet printing, adhesion, ice bucket rub resistance, etc. For example, the adhesion of the printed image can be evaluated by testing tape resistance, rub resistance, scratch resistance, etc. Ink buildup on the nozzle can be evaluated by taking photographs of the printer nozzle plate. Ice bucket rub resistance can be evaluated by immersing the bottle with the ink jet printed image into ice in a bucket for 24 hours, followed by measuring the rub resistance at firm thumb pressure. Solvent splash resistance can be evaluated by spraying 10 drops of isopropanol at a 45% angle to the substrate followed by measuring the rub resistance. Ink buildup during printer idle times can be evaluated by conducting a test run to see if a first column of the print drops out.

Embodiments of the ink jet ink composition of the invention have reduced ink buildup, e.g., capable of printing for 300 print cycles or more without ink buildup.

The following example further illustrates the invention but, of course, should not be construed as in any way limiting its scope.

EXAMPLE 1

This example illustrates the preparation of an embodiment of the inventive ink jet ink composition. The ink jet ink composition is prepared by combining the ingredients set forth below and mixing them by continuous stirring until a smooth composition is obtained, and optionally filtering the resulting composition.

| COMPONENT | Weight Percent |
|---|---|
| Methyl ethyl ketone | 64-66 |
| Nitrocellulose R3510 | 13-15 |
| Silcone Resin DC6-2230 | 1-3 |
| K-PLAST 1022 | 4-6 |
| Orasol Black RLI | 4-6 |
| Ethanol CDA-19 | 4-6 |
| MOWITAL B 60 HH | 0.4-0.6 |
| Silane A-187 | 1-2 |
| SILWET L-7622 | 0.02-0.04 |
| Total | 100.0 |

The ink jet ink composition thus prepared is ink jet printed on various glass substrates. The desirable ink jet ink composition reduces ink buildup on the printer nozzle plate and provides desirable characteristics such as improved solvent resistance, improved ice bucket rub resistance, and improved rub resistance of the printed images.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An ink jet ink composition comprising two or more organic solvents at least one of which is an alcohol, three or more binder resins comprising nitrocellulose, a thermoplastic polyurethane, and polyvinylbutyral, two or more adhesion promoters, and a soluble colorant, wherein the polyvinylbutyral is present in an amount from about 0.1% by weight to about 1% by weight of the ink jet ink composition.

2. The ink jet ink composition of claim 1, which includes, in addition to the alcohol, a ketone and/or esters as the organic solvents, and a polysiloxane and a silane as adhesion promoters.

3. The ink jet ink composition of claim 2, wherein the ketone is a ketone having 3 to 5 carbon atoms.

4. The ink jet ink composition of claim 3, wherein the ketone is methyl ethyl ketone.

5. The ink jet ink composition of claim 2, wherein the organic solvents are present in an amount from about 50% by weight to about 90% by weight, the binder resins are present in an amount from about 10% by weight to about 30% by weight, the adhesion promoters are present in an amount from about 1% by weight to about 10% by weight, and the colorant is present in an amount from about 3% by weight to about 10% by weight of the ink jet ink composition.

6. The ink jet ink composition of claim 2, wherein the alcohol is an alcohol having 1 to 4 carbon atoms.

7. The ink jet ink composition of claim 6, wherein the alcohol is ethanol or isopropanol.

8. The ink jet ink composition of claim 3, wherein the ketone is present in an amount from about 55% by weight to about 80% by weight of the ink jet ink composition.

9. The ink jet ink composition of claim 6, wherein the alcohol is present in an amount from about 2% by weight to about 10% by weight of the ink jet ink composition.

10. The ink jet ink composition of claim 1, wherein the nitrocellulose is present in an amount from about 10% by weight to about 20% by weight of the ink jet ink composition.

11. The ink jet ink composition of claim 1, wherein the thermoplastic polyurethane is present in an amount from about 2% by weight to about 8% by weight of the ink jet composition.

12. The ink jet ink composition of claim 1, wherein the polyvinylbutyral has a number average molecular weight (MW) of about 20,000 or greater.

13. The ink jet ink composition of claim 1, wherein the polyvinylbutyral is present in an amount from about 0.3% by weight to about 0.8% by weight of the ink jet ink composition.

14. The ink jet ink composition of claim 2, wherein the silane is gamma-glycidoxypropyl trimethoxysilane.

15. The ink jet ink composition of claim 2, wherein the silane is present in an amount from about 0.1% by weight to about 3% by weight of the ink jet ink composition.

16. The ink jet ink composition of claim 2, wherein the polysiloxane is present in an amount from about 1% by weight to about 5% by weight of the ink jet ink composition.

17. The ink jet ink composition of claim 1, wherein the colorant is a dye.

18. The ink jet ink composition of claim 17, wherein the dye is a black azo dye.

19. The ink jet ink composition of claim 1, further including a wetting agent.

20. The ink jet ink composition of claim 19, wherein the wetting agent is a polyalkyleneoxide-modified polydimethylsiloxane.

21. The ink jet ink composition of claim 20, wherein the polyalkyleneoxide-modified polydimethylsiloxane is present in an amount from about 0.001% by weight to about 0.1% by weight of the ink jet ink composition.

22. A method for printing ink jet ink images on a substrate comprising ejecting from a plurality of orifices a series of droplets of the ink jet ink composition of claim 1 to the substrate, controlling the timing of the emitted droplets with respect to the movement of the substrate so that the droplets form an image on the substrate, and allowing the images to dry.

23. The method of claim 22, wherein the substrate is glass or metal.

* * * * *